United States Patent
Kwon

(10) Patent No.: US 10,466,996 B2
(45) Date of Patent: Nov. 5, 2019

(54) SERVER AND METHOD FOR PROVIDING SOFTWARE UPDATE INFORMATION OF VEHICULAR MODULE

(71) Applicants: Hyundai Motor Company, Seoul (KR); Kia Motors Corporation, Seoul (KR)

(72) Inventor: Seok Joo Kwon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/806,087

(22) Filed: Nov. 7, 2017

(65) Prior Publication Data

US 2018/0275983 A1    Sep. 27, 2018

(30) Foreign Application Priority Data

Mar. 21, 2017 (KR) ........................ 10-2017-0035351

(51) Int. Cl.
| | | |
|---|---|---|
| *G06F 8/65* | (2018.01) | |
| *G01C 21/34* | (2006.01) | |
| *H04L 29/08* | (2006.01) | |
| *G06F 16/13* | (2019.01) | |
| *H04W 4/50* | (2018.01) | |
| *H04W 4/029* | (2018.02) | |
| *H04W 4/40* | (2018.02) | |
| *H04W 4/90* | (2018.02) | |

(52) U.S. Cl.
CPC .............. *G06F 8/65* (2013.01); *G01C 21/34* (2013.01); *G06F 16/13* (2019.01); *H04L 67/34* (2013.01); *H04W 4/029* (2018.02); *H04W 4/40* (2018.02); *H04W 4/50* (2018.02); *H04L 67/12* (2013.01); *H04W 4/90* (2018.02)

(58) Field of Classification Search
CPC ........................................................ G06F 8/65
USPC ........................................................ 717/169
See application file for complete search history.

(56) References Cited

U.S. PATENT DOCUMENTS

| | | | | |
|---|---|---|---|---|
| 2011/0307882 | A1* | 12/2011 | Shiba .......................... | G06F 8/65 717/173 |
| 2014/0109075 | A1* | 4/2014 | Hoffman .................... | G06F 8/65 717/169 |
| 2014/0170602 | A1* | 6/2014 | Reed ..................... | G09B 19/167 434/62 |

(Continued)

OTHER PUBLICATIONS

Mansor et al.; "Don't Brick Your Car: Firmware Confidentiality and Rollback for Vehicles"; 10th International Conference on Availability, Reliability and Security (ARES 2015); Aug. 2015 (Year: 2015).*

*Primary Examiner* — Qing Chen
*Assistant Examiner* — Clint Thatcher
(74) *Attorney, Agent, or Firm* — Morgan, Lewis & Bockius LLP

(57) ABSTRACT

A server and a method for providing software update information related to a vehicular module may be configured to provide a server for providing software update information related to a vehicular module that may extract a software updatable module to provide software update information thereto based on module use information related to another vehicle corresponding to an estimated driving route and an estimated driving time of a software update target vehicle.

4 Claims, 4 Drawing Sheets

(56) References Cited

U.S. PATENT DOCUMENTS

| | | | | |
|---|---|---|---|---|
| 2015/0227359 A1* | 8/2015 | Todoroki | ............... | G06F 8/65 |
| | | | | 717/169 |
| 2015/0248795 A1* | 9/2015 | Davidson | ............ | G01C 21/34 |
| | | | | 701/1 |
| 2015/0301821 A1* | 10/2015 | Danne | ................ | H04L 67/06 |
| | | | | 717/169 |
| 2016/0378455 A1* | 12/2016 | Lochan | .............. | G06F 8/65 |
| | | | | 717/169 |
| 2017/0300313 A1* | 10/2017 | Gantt, Jr. | ............... | G06F 8/65 |
| 2017/0344355 A1* | 11/2017 | Sarkar | ................. | G06F 8/65 |
| 2018/0099564 A1* | 4/2018 | Koebler | ........... | B60L 15/2045 |
| 2018/0225968 A1* | 8/2018 | Wang | ................. | G08G 1/13 |
| 2018/0257664 A1* | 9/2018 | Remboski | ............ | G07C 5/008 |

* cited by examiner

SERVER AND METHOD FOR PROVIDING SOFTWARE UPDATE INFORMATION OF VEHICULAR MODULE

CROSS-REFERENCE TO RELATED APPLICATION

The present application claims priority to Korean Patent Application No. 10-2017-0035351 filed on Mar. 21, 2017, the entire contents of which is incorporated herein for all purposes by this reference.

BACKGROUND OF THE INVENTION

Field of the Invention

The present invention relates to a server and a method for providing software update information related to a vehicular module.

Description of Related Art

Devices of a vehicle perform control and convenience functions based on software stored in each microprocessor thereof. A vehicle maker stores an initial version of software in each device and then releases a corresponding vehicle, and after the vehicle has been released, the vehicle maker produces and distributes a subsequent version of software for a purpose of improving performance, adding functions, etc. When a new version of software is distributed, a driver downloads it through wired or wireless communication and updates previous software. However, while a vehicle is running, it is difficult to update some of the devices that are being used, thus when the driving of the vehicle is stopped, updating for the devices of the vehicle is performed in a batch.

However, such a method requires much time to update the software of the vehicular device and requires the vehicle to be turned on until the downloading and updating of the software is completed, wasting fuel and increasing air pollutant emissions, which adversely affects the air environment.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a server and a method that may selectively provide software update information to a software update target vehicle based on module use information related to another vehicle corresponding to an estimated driving route and an estimated driving time of the software update target vehicle.

In addition to the above-mentioned objects, an exemplary embodiment of the present invention may be used for other objects that are not mentioned in detail.

Various aspects of the present invention are directed to providing a server for providing software update information related to a vehicular module, including: a module use information receiving portion configured to receive a driving route, a passing time of each route, and module use information related to a vehicle transmitted from a plurality of vehicular terminals; a first database configured to store a software file of a latest version and update-required time information; a driving information receiving portion configured to receive driving information related to a first vehicle transmitted from a first vehicular terminal of the plurality of vehicular terminals; an update module extracting portion configured to extract a using module and an updatable module of the first vehicle based on the module use information corresponding to the received driving information related to the first vehicle; and an update information transmitting portion configured to transmit a software file of a latest version corresponding to the extracted updatable module of the first vehicle to the first vehicular terminal.

The server for providing the software update information related to the vehicular module may further include a second database configured to store the module information related to the first vehicle.

The update module extracting portion may extract a candidate module based on the extracted using module and the stored module information related to the first vehicle, and may extract the updatable module based on the stored update-required time information.

The driving information may include an estimated driving route, an estimated driving time, a driving speed, and software version information.

The server for providing the software update information related to the vehicular module may further include an exception information transmitting portion configured to store a previous version software file of a predetermined vehicular module and to transmit the stored previous version software file to the first vehicular terminal.

The first vehicle may receive the previous version software file to execute a safe mode.

Various aspects of the present invention are directed to providing a method for providing software update information related to a vehicular module, including: storing a software file of a latest version and update-required time information in a first database; storing module information related to a first vehicle in a second database; receiving, by a module use information receiver, a driving route, a passing time of each route, and module use information related to a vehicle transmitted from a plurality of vehicular terminals; receiving, by a driving information receiver, driving information related to the first vehicle transmitted from a first vehicular terminal of the plurality of vehicular terminals; extracting, by an update module extractor, a using module based on the module use information corresponding to the received driving information related to the first vehicle, and extracting an updatable module of the first vehicle based on the update-required time information; and transmitting, by an update information transmitter, the software file of the latest version corresponding to the extracted updatable module of the first vehicle to the first vehicular terminal.

The driving information may include an estimated driving route, an estimated driving time, a driving speed, and software version information.

The method for providing the software update information related to the vehicular module may further include extracting, by the update module extractor, a candidate module based on the extracted using module and the stored module information related to the first vehicle, wherein the extracting of the updatable module of the first vehicle may include determining a required driving time corresponding to the estimated driving route based on the driving speed; and comparing the update-required time information corresponding to the extracted candidate module and the determined required driving time to extract the updatable module of the first vehicle.

The method for providing the software update information related to the vehicular module may further include: storing, by an exception information transmitter, a previous version software file corresponding to a predetermined vehicular module; and transmitting the stored previous version software file to the first vehicular terminal when the first vehicle is detected to be in an emergency state.

According to the exemplary embodiment of the present invention, it is possible to prevent fuel waste and air pollution due to idling of a vehicle by updating software while the vehicle is being driven. In addition, it is possible to prevent interference between a module in use and an unused module by updating software of the unused module while the vehicle is being driven.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
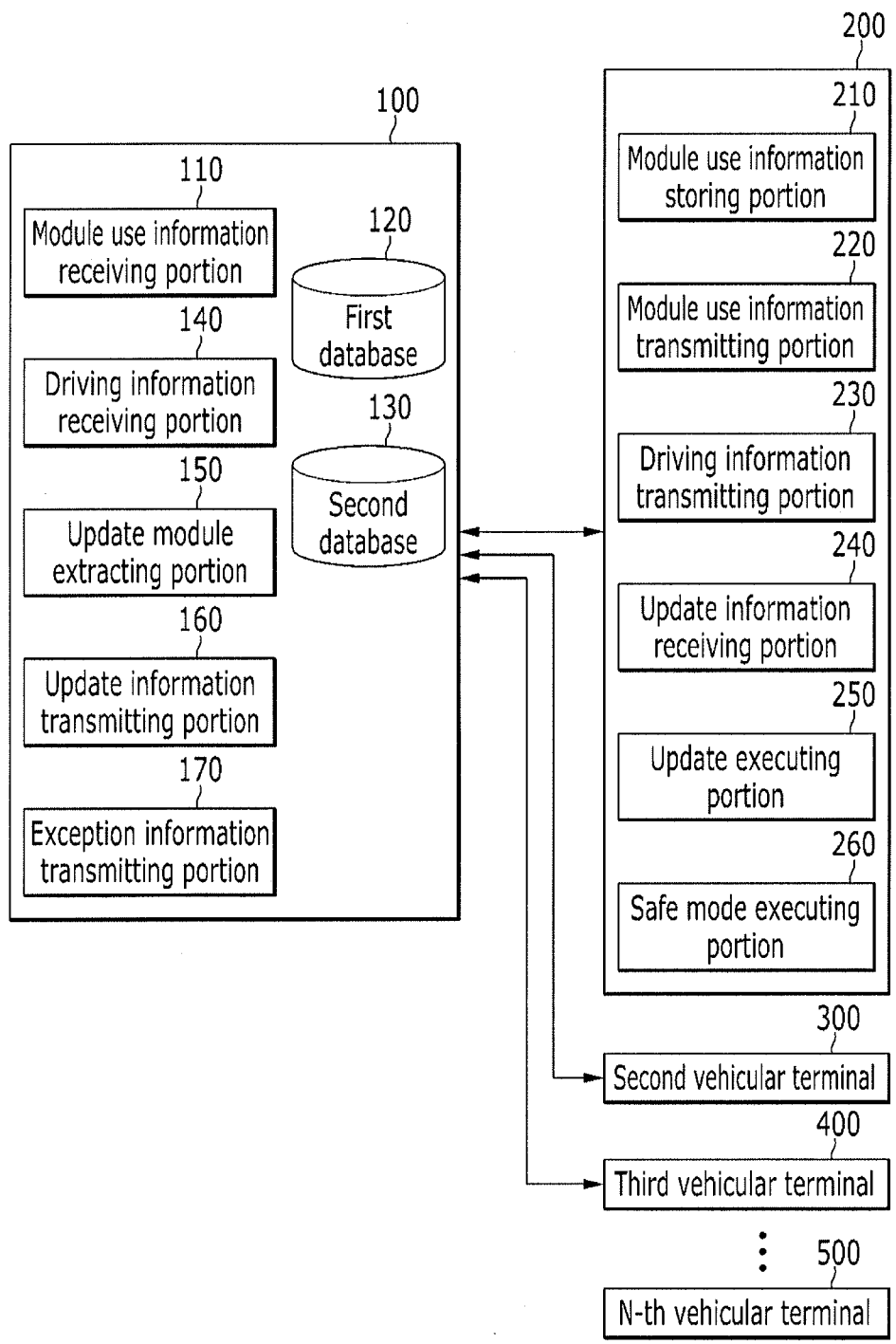
FIG. 1 illustrates a schematic view of a software update system of a vehicular module according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings to be easily practiced by a person skilled in the art to which the present invention pertains. As those skilled in the art would realize, the described embodiments may be modified in various different ways, all without departing from the spirit or scope of the present invention.

The drawings and description are configured to be regarded as illustrative in nature and not restrictive. Like reference numerals designate like elements throughout the specification. In addition, the detailed description of widely known technologies will be omitted.

In the present specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean devices for processing at least one function or operation, and can be implemented by hardware components or software components or combinations thereof.

FIG. 1 illustrates a schematic view of a software update system of a vehicular module according to an exemplary embodiment of the present invention.

The software update system of FIG. 1 includes a server 100 for providing software update information to a vehicular terminal, and a plurality of vehicular terminals (200, 300, 400, . . . ) connected to the server 100 through a wireless communication network and updating software of vehicular modules based on the software update information transmitted from the server 100.

Hereinafter, it will be exemplarily described that a first vehicle includes a first vehicular terminal 200 that requires an update of software, while a second vehicle includes a second vehicular terminal 300, a third vehicle includes a third vehicular terminal 400, and an N-th vehicle includes an N-th vehicular terminal 500 of which software updates are respectively completed.

The software update information providing server (hereinafter referred to as the "server") includes a module use information receiving portion 110, a first database 120, a second database 130, a driving information receiving portion 140, an update module extracting portion 150, an update information transmitting portion 160, and an exception information transmitting portion 170.

The module use information receiving portion 110 receives module use information transmitted from the first to N-th vehicular terminals 200 to 500. In the instant case, the module use information includes a driving route of a vehicle, a passing time of each route (a driving time zone), and module use information for each route. Herein, the module corresponds to a vehicular module included in an engine system, a transmission system, a lighting system, a brake pedal system, an accelerator pedal system, a steering wheel system, a window system, an air conditioner system, or the like, and the module performs a control function based on software. For example, a first module M1 stores first software for performing an engine control function, a second module M2 stores second software for performing a steering wheel control function, and a third module M3 stores third software for performing an air conditioner control function.

The first database 120 stores software information. The first database 120 stores a software file of a latest version of each module and an update-required time. In the instant case, the update-required time includes a software file transmitting time (a download time at a vehicular terminal).

The second database 130 stores module use information received through the module use information receiving portion 110. For example, the module use information is as shown in Table 1, and use modules for each vehicle may be stored according to a driving route and a driving time.

TABLE 1

| Driving route | Driving time | Usage module | Vehicle |
|---|---|---|---|
| $P_{1,1}$ | AM 09:00 | M1, M3, M5, M23 | Second vehicle |
| $P_{1,1}$ | AM 08:30 | M1, M3, M5, M23 | Third vehicle |
| $P_{1,1}$ | . . . | . . . | . . . |
| $P_{1,1}$ | AM 08:45 | M1, M7, M23 | N-th vehicle |
| $P_{1,2}$ . . . | AM 10:00 | M1, M3, M5 | Second vehicle |
| $P_{1,2}$ . . . | . . . | . . . | . . . |
| $P_{2,1}$ | PM 06:00 | M2, M4, M10 | Third vehicle |
| $P_{2,1}$ | . . . | . . . | . . . |
| $P_{2,1}$ | PM 06:15 | M2, M8, M10 | N-th vehicle |
| . . . | . . . | . . . | . . . |

Figure 2:
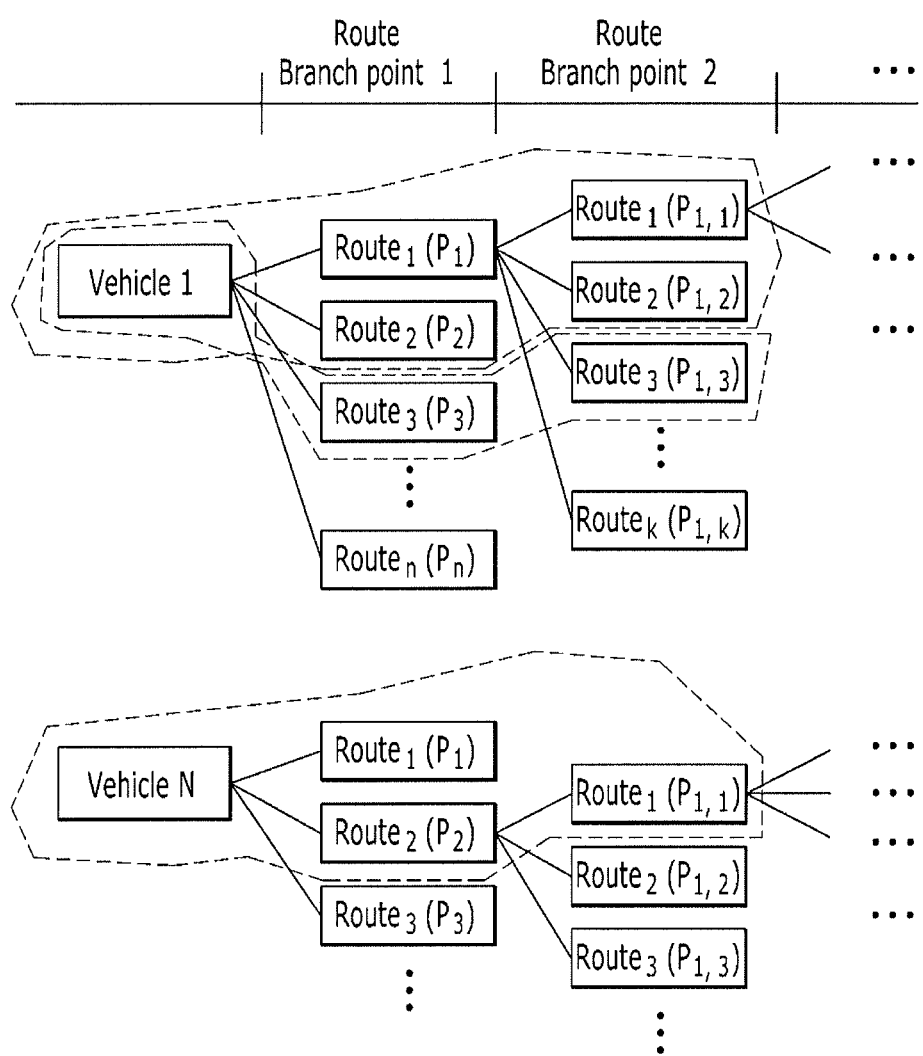
FIG. 2 illustrates routes according to an exemplary embodiment of the present invention.

Herein, the driving route P, as shown in FIG. 2, includes a plurality of detailed routes based on a branch point. Specifically, even though a departure point and a destination are the same, there may be a large number of driving routes (P1, P2, . . . , Pn) from the departure point to the destination, and in the instant case, P1=P1,1+P1,2+ . . . +P1,k may be represented.

In addition, the second database 130 stores module information related to each vehicle. Herein, the module information is information on all the modules included in each vehicle, and it may be stored, for example, as shown in Table 2.

TABLE 2

| Vehicle | Module information |
|---|---|
| First vehicle | M1, M2, M3, . . . , M25 |
| Second vehicle | M1, M2, M3, . . . , M23 |
| Third vehicle | M1, M2, . . . , M17, M20, M21, M22, M23 |
| . . . | . . . |

The driving information receiving portion 140 receives driving information related to the first vehicle transmitted from the first vehicular terminal 200. Herein, the driving information includes a driving speed, an estimated driving route, an estimated driving time (estimated passing time), and software version information for each module, of the first vehicle. In addition, the driving information receiving portion 140 receives identification information related to the first vehicle.

The update module extracting portion 150 extracts an updatable module (hereinafter referred to as "update module") corresponding to the driving information related to the first vehicle based on the module use information stored in the second database 130. Specifically, when it is estimated that the first vehicle is going to drive on the route (P1,1) for the time (t) based on the driving information, the update module extracting portion 150 extracts a module used in a vehicle having driven on the route (P1,1) for the time (t) based on the module use information stored in the second database 130.

Figure 3:
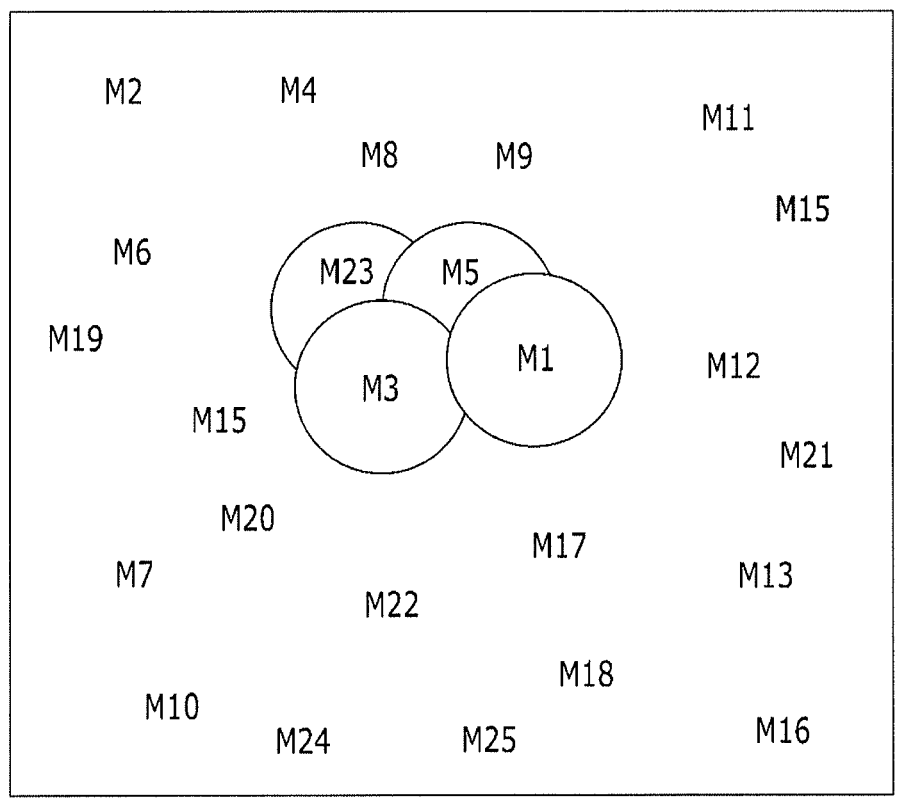
FIG. 3 illustrates an extraction result of a using module set and a candidate module set according to an exemplary embodiment of the present invention.

FIG. 3 illustrates an extraction result of a using module set and a candidate module set according to an exemplary embodiment of the present invention.

For example, when M1, M3, M5, and M23 of the second vehicle having driven on the route (P1,1) for the time (t) are used, M1, M3, M5, and M23 of the third vehicle having driven on the route (P1,1) for the time (t) are used, and M1, M3, and M23 of the N-th vehicle having driven on the route (P1,1) for the time (t) are used, as shown in FIG. 3, a set of used modules (M1, M3, M5, and M23) may be extracted by union thereof.

Referring back to FIG. 1, the update module extracting portion 150 extracts a candidate module set excluding the used module set through the module information related to the first vehicle stored in the second database 130. For example, as shown in FIG. 3, when the module information related to the first vehicle corresponds to M1 to M25, modules excluding the used module set (M1, M3, M5, and M23) may be extracted as a first candidate module set (M2, M4, M6 to M22, M24, and M25).

In addition, the update module extracting portion 150 extracts a second candidate module set requiring an update by comparing software version information for each module of the first vehicle received through the driving information receiving portion 140 and the software file of the latest version stored in the first database 120.

Further, the update module extracting portion 150 extracts a final update module from the second candidate module set based on a download time and an update time of the software file of the latest version stored in the first database 120. The update module extracting portion 150 determines a required driving time on the route P1,1 based on the speed information among the driving information related to the first vehicle, and extracts a module of which the download and update time of the software file is less than the determined required driving time as a last update module.

The update information transmitting portion 160 transmits the software file of the latest version corresponding to the final update module extracted by the update module extracting portion 150 to the first vehicular terminal 200.

When the software file of the latest version corresponding to a predetermined module is transmitted to the first vehicular terminal 200, the exception information transmitting portion 170 stores a software file of a previous version, and when an emergency situation occurs in the first vehicle, it transmits the software file of the stored previous version to the first vehicular terminal 200. In the instant case, the predetermined module is one related to safety of vehicle occupants (driver and passenger).

The first vehicular terminal 200, the second vehicular terminal 300, the third vehicular terminal 400, and the N-th vehicular terminal 500 of FIG. 1 have the same configuration, thus a detailed configuration of the first vehicular terminal 200 will now be referred to as an example.

The first vehicular terminal 200 of FIG. 1 includes a module use information storing portion 210, a module use information transmitting portion 220, a driving information transmitting portion 230, an update information receiving portion 240, an update executing portion 250, and a safe mode executing portion 260.

The module use information storing portion 210 stores the driving route, the passing time of each route, and the module use information on each route of the first vehicle.

The module use information transmitting portion 220 transmits the driving route, the passing time of each route, and the module use information on each route stored in the module use information storing portion 210 to the server 100.

The driving information transmitting portion 230 transmits the driving information related to the first vehicle to the server 100. The driving information transmitting portion 230 determines an estimated driving route based on a current position of the first vehicle and a destination inputted by the driver, determines an estimated passing time of each detailed route included in the determined estimated driving route, and transmits it to the server 100. In addition, the driving information transmitting portion 230 transmits the software version information for each module included in the first vehicle to the server 100, and transmits the speed information related to the first vehicle to the server 100 in real time.

The update information receiving portion 240 receives the software file of the latest version transmitted from the server 100.

The update executing portion 250 executes updating of the software file of the latest version received through the update information receiving portion 240. In the instant case, the module in which the updating is being executed does not affect the driving of the first vehicle.

When it is determined that the first vehicle is in an emergency state during the updating of the software for the predetermined module, the safe mode executing portion 260 notifies the emergency state to the server 100, and receives the software file of the previous version transmitted from the server 100 to perform the corresponding function. For example, the safe mode executing portion 260 perform the control function of the first vehicle in a limp-home mode.

Figure 4:
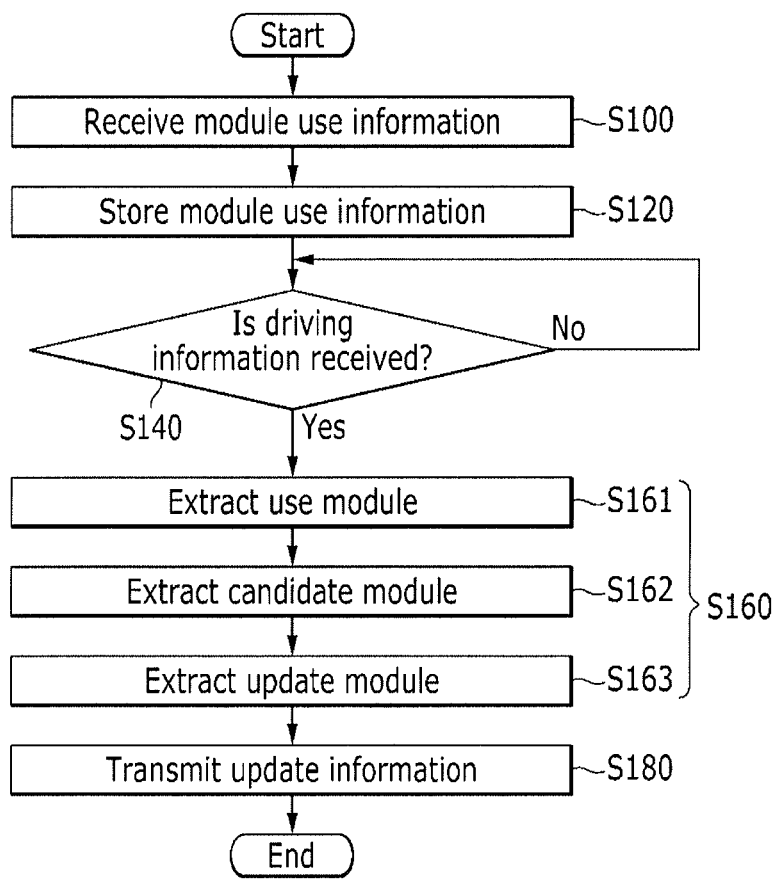
FIG. 4 illustrates a flowchart of a method for providing software update information through the software update system of the vehicular module of FIG. 1.

FIG. 4 illustrates a flowchart of a method for providing software update information through the software update system of the vehicular module of FIG. 1.

First, the server 100 receives the module use information transmitted from the plurality of vehicular terminals (200, 300, 400, . . . , 500) through the module use information receiving portion 110 (S100), and stores the received module use information in the second database 130 (S120).

Subsequently, the server 100 receives the identification information and the driving information transmitted from the first vehicular terminal 200 through the driving information receiving portion 140 (S140). Herein, the driving information includes the driving speed, the estimated driving route, and the estimated driving time (estimated passing time) of the first vehicle. In addition, in step S140, the current version information related to the software corresponding to the module included in the first vehicle is further received thereby.

Next, the update module corresponding to the driving information received at step S140 through the update module extracting portion 150 is extracted (S160).

Specifically, based on the module use information stored in the second database 130, a use module of another vehicle corresponding to the estimated driving route and estimated passing time received at step S140 is extracted (S161).

Next, the candidate module excluding the use module extracted at step S161 are extracted from the module information related to the first vehicle stored in the second database 130 (S162).

Next, a time required to pass the estimated driving route is determined using the driving speed received at step S140, and the update module is extracted according to a result of comparing the determined time with the time required to update the software of the candidate module extracted at step S162 (S163). At step S163, only the candidate module of which the time (Tupdate) required to update the software is less than the time (Tpath) required for the first vehicle to pass the estimated driving route is extracted as the final update module. In addition, at step S163, the software version information for each module of the first vehicle received at step S140 is compared with the latest version of the software file stored in the first database 120, and based on the compared result, by comparing time required to update the candidate modules required to be updated, the final update module is extracted.

Next, the software file of the latest version corresponding to the final update module extracted at step S163 is transmitted to the first vehicular terminal 200 (S180).

According to the exemplary embodiment of the present invention, by transmitting the latest version software file of the updatable module to the vehicular terminal based on the module use information related to another vehicle corresponding to the estimated driving route and the estimated driving time of the vehicle to be software-updated, it is possible to stably perform the software update for the unused module while driving.

According to the exemplary embodiment of the present invention, while updating the module related to the safety of the vehicle occupant, the software file of the previous version of the corresponding module may be stored in the server, and when an emergency occurs in the vehicle, the software file of the previous stored version may be transmitted to support the limp-home mode, improving driving safety.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A server for providing software update information related to a vehicular module, comprising:
   a module use information receiving portion configured to receive a driving route, a passing time of each route, and module use information related to a vehicle transmitted from a plurality of vehicular terminals;
   a first database configured to store a software file of a latest version and update-required time information;
   a driving information receiving portion configured to receive driving information related to a first vehicle transmitted from a first vehicular terminal of the plurality of vehicular terminals;
   an update module extracting portion configured to extract a using module and an updatable module of the first vehicle based on the module use information corresponding to the received driving information related to the first vehicle;
   an update information transmitting portion configured to transmit a software file of a latest version corresponding to the extracted updatable module of the first vehicle to the first vehicular terminal; and
   an exception information transmitting portion configured to store a previous version software file of a predetermined vehicular module and to transmit the stored previous version software file to the first vehicular terminal,
   wherein the first vehicle receives the previous version software file to execute a safe mode, and
   wherein the update module extracting portion extracts a candidate module based on the extracted using module and the stored module information related to the first vehicle, and extracts the updatable module based on the stored update-required time information.

2. The server for providing the software update information related to the vehicular module of claim 1, further including
a second database configured to store the module information related to the first vehicle.

3. The server for providing the software update information related to the vehicular module of claim 1, wherein
the driving information includes an estimated driving route, an estimated driving time, a driving speed, and software version information.

4. A method for providing software update information related to a vehicular module, comprising:
storing a software file of a latest version and update-required time information in a first database;
storing module information related to a first vehicle in a second database;
receiving, by a module use information receiver, a driving route, a passing time of each route, and module use information related to a vehicle transmitted from a plurality of vehicular terminals;
receiving, by a driving information receiver, driving information related to the first vehicle transmitted from a first vehicular terminal of the plurality of vehicular terminals;
extracting, by an update module extractor, a using module based on the module use information corresponding to the received driving information related to the first vehicle, and extracting an updatable module of the first vehicle based on the update-required time information;
transmitting, by an update information transmitter, the software file of the latest version corresponding to the extracted updatable module of the first vehicle to the first vehicular terminal;
storing, by an exception information transmitter, a previous version software file corresponding to a predetermined vehicular module;
transmitting the stored previous version software file to the first vehicular terminal when the first vehicle is detected to be in an emergency state; and
extracting by the update module extractor, a candidate module based on the extracted using module and the stored module information related to the first vehicle,
wherein the extracting of the updatable module of the first vehicle includes: determining a required driving time corresponding to the estimated driving route based on the driving speed; and comparing the update-required time information corresponding to the extracted candidate module and the determined required driving time to extract the updatable module of the first vehicle, and
wherein the driving information includes an estimated driving route, an estimated driving time, a driving speed, and software version information.

* * * * *